United States Patent [19]

Collyer et al.

[11] Patent Number: 4,752,487

[45] Date of Patent: Jun. 21, 1988

[54] STEAM INJECTION PROCESS

[75] Inventors: Stephen G. Collyer, Bracknell; Albert C. Hersom, Beaconsfield, both of Great Britain

[73] Assignee: Nestec S.A., Vevey, Switzerland

[21] Appl. No.: 923,161

[22] Filed: Oct. 24, 1986

[30] Foreign Application Priority Data

Nov. 5, 1985 [GB] United Kingdom ............... 8527221

[51] Int. Cl.⁴ .................... G01N 33/02; A23L 3/18
[52] U.S. Cl. .................................. 426/231; 426/511; 426/521
[58] Field of Search ............... 426/511, 521, 231, 520

[56] References Cited

U.S. PATENT DOCUMENTS 4,419,301 12/1983 Nahra et al. ................... 426/521

FOREIGN PATENT DOCUMENTS 464080 2/1974 Australia ..................... 426/511
785353 7/1980 U.S.S.R. .

Primary Examiner—George Yeung
Attorney, Agent, or Firm—Vogt & O'Donnell

[57] ABSTRACT

Automatic control for achieving a required temperature of a food product feed stock being heated with steam injection is effected by calculating with at least one computer the required steam flow rate from the measured feed stock temperature, the measured feed stock flow rate, and the measured and required temperature of the feed stock product after steam injection and by controlling the quantity of steam supplied in relation to the deviation between the measured and the required steam flow rates and by controlling the feed stock flow rate in relation to the deviation between the measured and the required feed stock flow rates.

17 Claims, 1 Drawing Sheet

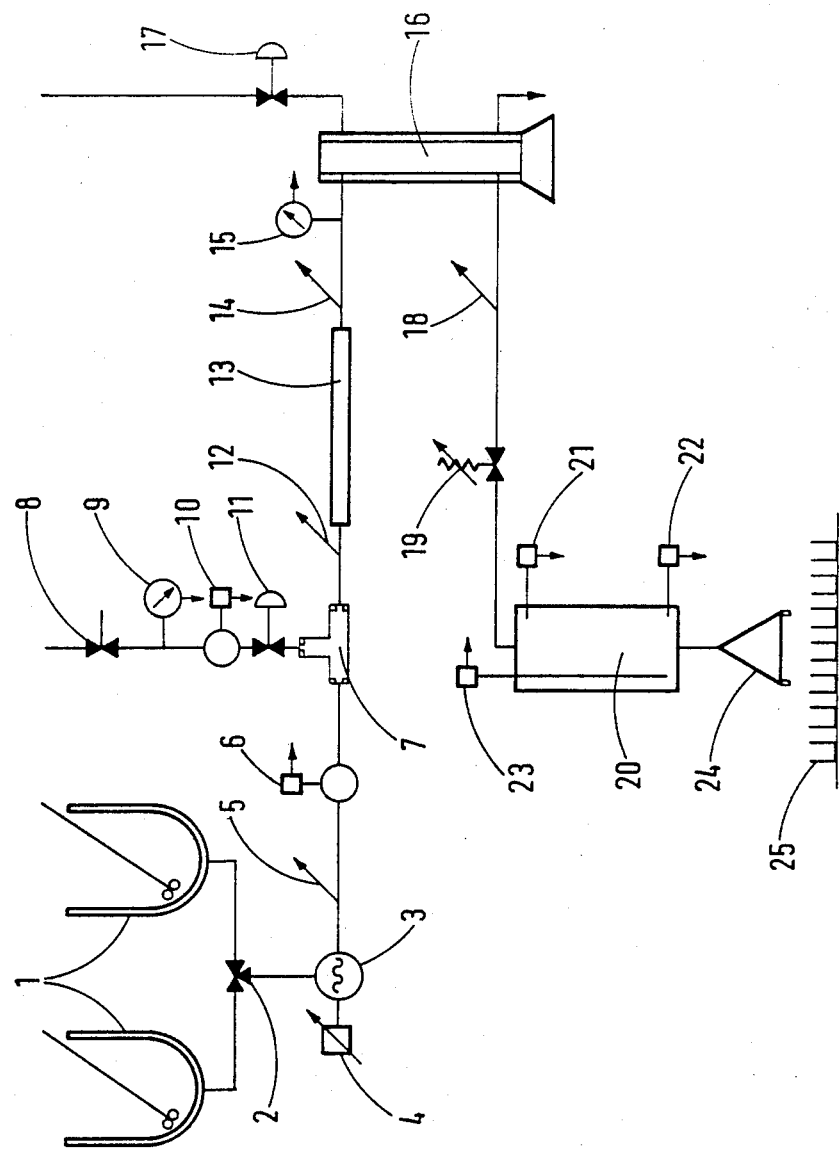

STEAM INJECTION PROCESS

BACKGROUND OF THE INVENTION

The present invention relates to a process for the automatic control of the temperature of a food product continuously heated by the direct injection of steam, where the flow of the food product through the injector may be varied.

In its simplest form, a steam injector consists of a pipe through which the product feed stock is pumped at a constant rate and steam is introduced through a jet or orifice plate from a high pressure supply line which can be modulated by a valve. A sufficient minimum length of pipe downstream from the injection point is required to ensure that thorough mixing of the feed stock and steam has occurred before an accurate measurement of the resulting temperature can be obtained. This essential delay before measurement means that any alteration in conditions which causes a variation in the final product temperature will not be detected for approximately five seconds after its occurrence and before any corrective action can be taken, for example, by means of traditional control technology using a three-term control algorithm in the feed-back loop. Any gradual change in conditions such as a slow increase in feed stock temperature can easily be compensated for this method. However, sudden changes, for example, caused by switching to a second feed stock batch at an appreciably higher or lower pre-injection temperature, can cause considerable disruption to the smooth running of the system and runs the risk (where the heating is being used to sterilise the product) of non-sterile product reaching the filler header tank. The signal from a pre-injection thermocouple could be used to compensate for sudden temperature variations of this nature using a conventional controller, but to ensure that the feed-forward compensation was applied at the correct moment in time, the position of this thermocouple would be dependent on the feed stock flow rate and would physically need to be moved if the feed stock flow rate were changed.

In practice, in an industrial situation, the demand for heated product by the filling line will vary depending on the number of breakdowns experienced on that line and it is advantageous to limit the amount of product which is stored hot in the header tank so as to prevent thermal degradation of the food product, for example, by hydrolysis of the thickening agents or from discolouration, browning, Maillard reactions, off-flavours or burn-on. This limitation may best be achieved by varying the rate at which the product is injected to the required temperature.

Soviet Inventor's Certificate No. 785,353 describes a method for the automatic control of a process for the production of alcohol by cooking starch-containing material with steam, which provides for measurement of the actual temperature of the mass after the secondary heating contact head, and regulation of the steam supply, characterised in that, for this purpose of improving cooking quality, the set value for the steam throughput is determined in dependence on the actual temperature and throughput of the mix, and the actual and set temperatures of the mass after the secondary heating contact head, while the supply of steam is regulated in dependence on deviation between the current and set values of steam throughput. However, since there is no feed-back indicated or mentioned from the feed stock flow rate sensor to the feed stock pump in the Soviet process, it is not possible to implement automatic feed stock flow rate control with this equipment.

When direct steam injection is used for the sterilisation of a food product in a continuous process it is necessary to have extremely precise control of the temperature and holding time at temperatures appreciably above 100° C. and pressures well above atmospheric to avoid under- or over-processing giving the associated disadvantages mentioned above. In order to achieve this, we have found that, unlike the Soviet process, it is essential to have the means for the automatic control of the feed stock flow rate.

In any case, this Soviet process does not relate to a sterilisation process. In the description of the apparatus, the absence of any pressure regulating valve or orifice before the steam separation vessel would make the operation of the plant much above 100° C. or much above atmospheric pressure impossible and thus this process could not be used in sterilisation applications. Any back-pressure to cause operation above atmospheric pressure would be generated by the frictional forces opposing the pumping operation through the pipes, plus the static head (if any) by which the product would be raised by the pumping operation. The holding time would depend on the feed stock flow rate, but means for automatic control of this is not really necessary in the Soviet process in which, for filling large vessels, the feed stock flow rate, which could be affected by the viscosity of the product and the back-pressure in the line after steam injection, would ideally be maintained constant over the widest possible range of viscosities and back-pressures by the use of a fixed speed, positive displacement pump.

SUMMARY OF THE INVENTION

Accordingly, the present invention provides a process for the automatic control of the temperature of a food product while being heated with steam in which the product is injected with a sufficient quantity of high pressure steam so that it reaches the required temperature characterised in that the required steam flow rate is calculated from the actual feed stock temperature, the actual feed stock flow rate, and the actual and required temperature of the product after steam injection while the quantity of steam supplied is controlled in relation to the deviation between the actual and the required steam flow rates and the feed stock flow rate is controlled in relation to the deviation between the actual and the required feed stock flow rates.

The control of the quantity of steam supplied and the control of the feed stock flow rate are generally carried out using a conventional three term algorithm.

It should be understood that in the calculation of the required steam flow rate other appropriate factors may be taken into consideration such as a factor to allow for the specific heat of the feed stock and a factor to allow for the radiant heat loss from the plant.

The actual operation of the process may conveniently be simplified whereby the operator can input the target product flow rate and the target product temperature and subsequent control is then restricted to stop and start buttons for the steam injector. The required product flow rate and temperature at which the process operates will be based on these target values though these can be affected by various other factors, e.g., a reduction in product demand.

Although the actual control of steam flow and feed stock flow may be achieved by conventional electric or electronic controllers, preferably, the control system of this invention comprises at least one computer to which the measurements are fed and which calculates the required steam and feed stock flow rates, which are used as set points. Instructions are then fed to the steam supply valve and the feed stock supply pump to effect the control of the temperature and holding time very precisely so as to ensure control over potentially a wide range of temperatures and flow rates.

Although a fully expanded form of the calculation of the steam flow required to heat the feed stock could be used by the computer, a reduced form of the calculation which assumes that the quantity of heat from one kilo of steam is independent of the pressure and that the specific heat of the feed stock does not vary between different products is used to obtain a faster response. The inputs to the calculation are thus the temperature difference (between the actual feed stock temperature and the required temperature) and the required feed stock flow rate. The output from the calculation is expressed in control units rather than litres or kilos per minute for the feed stock and steam flow rates respectively again for a faster response. Ideally, the characteristics of the modulating valve used for steam supply should be approximately linear over the range of operation required but factors may be included in this calculation to compensate for non-linearity in its characteristics.

The process of the present invention thereby provides for controlling heating of a fluid food product feed stock in a system for heating the feed stock with steam for achieving a required temperature of the heated feed stock. The process includes pumping and controlling a supply of the feed stock to a steam injector and supplying and controlling a quantity of steam to the steam injector for heating the feed stock and obtaining a steamed feed stock at the required temperature while, prior to the steam injector, measuring the temperature and flow rate of the feed stock pumped to the steam injector and measuring the flow rate of the steam supplied to the steam injector and while measuring the temperature of the steamed feed stock. The control is effected through the use of at least one computer by calculating the required steam flow rate from the measured feed stock temperature, the measured feed stock flow rate, the measured steamed feed stock temperature and the required steamed feed stock temperature for controlling the steam flow rate, calculating the deviation between the measured steam flow rate and a steam flow rate required for achieving the required steamed feed stock temperature for controlling the quantity of steam supplied, and calculating the deviation between the measured feed stock flow rate and a feed stock rate required for achieving the required steamed feed stock temperature for controlling the feed stock flow rate.

DETAILED DESCRIPTION OF THE INVENTION

The process of this invention may be used for control over a wide range of temperatures, for example, from 50° C. to 150° C. It is particularly suitable for sterilisation processes at temperatures from 115° C. to 150° C., more usually from 120° C. to 145° C. and preferably from 130° C. to 145° C. However, the process is also suitable where sterilisation is not required but where precise control of temperature and heating time are important. While pressure is desirable throughout the temperature range, at temperatures above 100° C. pressure must be used. The pressure is advantageously at least 0.5 bar above the expected temp/pressure relationship, for example, up to 5 bar guage at 150° C. The pressure is conveniently generated and/or regulated by a back-pressure valve such as a spring or pneumatically loaded pressure relief valve.

In the case where the heating is used to sterilise the food product, the required sterilisation temperature must be maintained for a calculated length of time to effect the sterilisation and this holding time can be achieved by adjustment of the feed stock flow rate. When there is a reduced demand for the product, the feed-stock flow rate can be reduced, e.g., down to 50%, but in order to prevent over-processing, a small reduction in the sterilisation temperature can be calculated so as to maintain a constant microbial load reduction; this amounts to approximately half of one degree centigrade for each 10% reduction in feed stock flow rate over the sterilisation temperature range 120° C. to 145° C.

The feed stock flow rate is conveniently controlled by a variable speed, positive displacement pump, preferably a screw pump such as a Monopump. Particularly desirable is the style of pump which is designed to handle high back pressures such as those encountered in the process of this invention. The feed stock flow rate may be affected by the viscosity of the product and the back-pressure generated after steam injection. If product demand is reduced, the variable speed pump may be used to slow down the rate of production by reducing the target product flow rate rather than waiting until a high level cut-out operates and waste time and materials restarting the equipment when the demand is restored. The computer can in this case be used to reduce the target product flow rate which after the calculation will reduce both the feed stock and steam flow set-points simultaneously, thus maintaining control of the temperature.

The use of a variable speed pump is also advantageous when a different feed stock product throughput is required as, for instance, when a different type of product is used or when filling containers of a smaller size. In the latter case, a single speed pump operating at the fastest usage rate would fill the header tank too quickly and the resulting product would then be exposed to additional heat degradation effects and might also cool to below the acceptable filling temperature before being used. The use of a variable speed pump can cope with these situations as well as the short term variations in product usage.

Adjustments to the steam-flow set point to allow for such things as variations in the specific heat of the feed stock or the heat capacity of the plant being used may be made using a temperature probe in the product after steam injection but this is used to generate an offset for the target product temperature rather than being used directly to control the steam flow. The advantage of separately correcting the error between the required and the actual product temperature and using a temperature offset in the calculation of the steam flow set point is that the control and calculation functions can be separated.

The separation of the control and calculation functions is also an advantage when variations occur in the feed stock flow rate, since changes in feed stock temperature have to be responded to at the moment the cooler or hotter feed stock reaches the point of steam injection and this delay between detection and injection will be dependent on the feed stock flow rate which can be compensated for by the monitoring computer.

Advantageously, in starting or restarting the plant, in order to minimise the time required to reach the required temperature, a separate start-up routine is employed which maximises the steam flow relative to the feed stock flow until the temperature of the product after steam injection is within about five degrees of the required temperature before allowing the normal control calculations to take over. This helps to establish the temperature offset (caused by the radiant heat loss and variations in the specific heat of the different feed stocks) more rapidly and also makes the control system independent of plant size.

The control system used in the process of the present invention most preferably comprises three computers which communicate together. While two control the feed stock flow and steam flow respectively by conventional means, e.g., a three term algorithm, the third is used to recalculate the set points and monitor the integrity of the system. The third computer can also be used to generate management information about the plant, for example, the total feed stock processed by the plant and (if the specific gravity of the feed stock is known) the total weight of product output.

The process of the present invention is suitable for the continuous heating or sterilisation of a wide variety of food products, provided that the products to be sterilised do not contain particulate materials greater than 5 mm in diameter so that sterilisation may be effected to the centre of these pieces without unduly increasing the holding time at the sterilisation temperature. Examples of food products which can be sterilised by this process include savoury sauces, soups, dessert sauces and custards.

After a sterilisation process, the food product should be cooled to below 100° C. and preferably to below 40° C. and the pressure should be maintained until cooling is complete. Even when the heated food product is not sterilised in the process, it is still advantageous to cool it below 40° C., provided the heat treatment of that food product has been completed. The cooling may be carried out, for example, by means of a steam separation vessel or, more preferably, by means of a heat exchanger, for example, a scraped surface heat exchanger.

The present invention will now be further illustrated by way of example with reference to the following drawing.

BRIEF DESCRIPTION OF THE DRAWING

FIG. 1 is a schematic view of an installation for controlling the sterilisation of a product.

DESCRIPTION OF THE PREFERRED EMBODIMENT

Referring to the drawing, feed stock batch mixing vessels 1 can be selected alternately using a valve 2 so as to provide a continuous feed stock supply. A positive displacement pump 3 is driven by a variable speed drive 4. The feed stock is pumped past a feed stock temperature thermocouple 5 and a feed stock flow meter 6 to an orifice steam injector 7. The steam supply is regulated at 7 bar gauge pressure and is supplied through a safety cut off valve 8. The supply pressure is monitored by a pressure transducer 9, while the steam flow is measured by a steam flow meter 10. A modulating valve 11 is used to control the steam flow to the injector. The temperature after both injection and thorough mixing can be measured by a thermocouple 12 before the product passes into a holding tube 13. A thermocouple 14 can be used to record the temperature after the sterilisation process, while a pressure gauge 15 is used to monitor the back pressure. The product is cooled using a scraped surface heat exchanger 16 using cold water as the cooling medium, whose flow may be regulated using a valve 17, responding (if required) to a signal from a cooled product thermocouple 18. The back pressure is maintained by a spring loaded pressure relief valve 19. The product is supplied to a filler header tank 20, whose contents may be monitored either by high and low level alarms, 21 and 22 respectively, or preferably by a continuous level device 23, which enables an optimum amount to be held in the filler header tank by varying the product flow rate according to the efficiency of the operation of a filler 24 on a filling line 25.

The following Example further illustrates the present invention in which percentages are given by weight.

EXAMPLE

A typical cheese sauce was prepared wherein 8% cheddar cheese was dispersed by heating with emulsifying salts in water before 43% milk and 8% butter were added. 5% wheatflour was then dispersed into the mixture together with suitable spices, seasonings and natural colours. The mixture was bulked to the final volume with water and heated to 65° C., before steam injection in the installation illustrated and described in FIG. 1 at a feed stock flow rate of 50 liters per minute, a sterilisation temperature of 137° C. and a back pressure of 4 bar guage. The product was held at 137° C. for 1 minute to ensure sterilisation before being cooled to 35° C. using a scraped surface heat exchanger and filled into cans under sterile filling conditions.

In this process, it was possible to turn down the production rate to 30 liters per minute without loss of temperature control or sterility, and to compensate both for the gradual cooling of the pre-heated feed stock as the batch was being used, and for a sudden change in temperature of 10° C. when the change-over to a new batch of feed stock occurred.

We claim:

1. A process for controlling heating of a fluid food product feed stock in a system for heating the feed stock with steam to required temperature comprising:
   pumping and controlling a supply of the feed stock to a steam injector and measuring temperature and flow rate of the feed stock pumped to the steam injector;
   supplying and controlling a quantity of steam to the steam injector for injection into and steaming of the feed stock for heating the feed stock to the required temperature and measuring flow rate of the steam supplied to the steam injector;
   measuring steamed feed stock temperature after the injection of steam into the feed stock; and
   calculating with at least one computer
   (i) the required steam flow rate from the measured feed stock temperature, the measured feed stock flow rate, the measured steamed feed stock temperature and the required steamed feed stock temperature for controlling the steam flow rate;
   (ii) the deviation between the measured steam flow rate and a steam flow rate required for achieving the required steamed feed stock temperature for controlling the quantity of steam supplied; and (iii) the deviation between the measured feed stock flow rate and a feed stock rate required for achieving the required steamed feed stock temperature for controlling the feed stock flow rate for achieving the required temperature of the steamed feed stock.

2. A process according to claim 1 wherein the required temperature is from 50° C. to 150° C.

3. A process according to claim 1 further comprising holding the steamed feed stock for a time after steam injection for heating to the required temperature and then measuring the temperature of the steamed feed stock.

4. A process according to claim 3 wherein the steamed feed stock is held for a time sufficient for sterilizing the steamed feed stock.

5. A process according to claim 4 wherein the required sterilizing temperature is from 120° C. to 145° C.

6. A process according to claim 3 wherein the feed stock flow rate is adjusted for achieving the holding of the steamed feed stock.

7. A process according to claim 4 wherein the feed stock contains particulate materials which are not greater than 5 mm in diameter.

8. A process according to claim 1 wherein the at least one computer calculates steam and feed stock flow rates for providing set points and for controlling the feed stock and steam flow rates.

9. A process according to claim 8 wherein there are three computers which communicate, two of which control feed stock flow and steam flow while the third recalculates the set points.

10. A process according to claim 9 wherein the third computer further monitors the feed stock heating system.

11. A process according to claim 2 wherein the required temperature is above 100° C. further comprising regulating pressure in the system.

12. A process according to claim 3 further comprising measuring the temperature of the steam feed stock after steam injection and prior to holding the steamed feed stock.

13. A process according to claim 3 further comprising regulating pressure in the system.

14. A process according to claim 13 wherein the pressure is regulated to be at least 0.5 bar above the expected pressure of the steamed feed stock at the required temperature.

15. A process according to claim 3 wherein the at least one computer calculates steam and feed stock flow rates for providing set points and for controlling the feed stock and steam flow rates.

16. A process according to claim 15 wherein there are three computers which communicate, two of which control feed stock flow and steam flow while the third recalculates the set points.

17. A process according to claim 1 further comprising cooling the heated food product feed stock after heating the feed stock to the required temperature.

* * * * *

UNITED STATES PATENT AND TRADEMARK OFFICE
CERTIFICATE OF CORRECTION

PATENT NO. : 4,752,487
DATED : June 21, 1988
INVENTOR(S) : Stephen COLLYER, et al.

It is certified that error appears in the above-identified patent and that said Letters Patent is hereby corrected as shown below:

On the title page, "ABSTRACT" should be --ABSTRACT OF THE DISCLOSURE--.

Column 1, line 27, after "for" insert --by--.

Column 1, line 59, "this" should be --the--.

Column 4, line 3, "guage" should be --gauge--.

Column 6, line 33, "guage" should be --gauge--.

Column 6, line 47, [line 3 of claim 1], after "to" insert --of--.

Signed and Sealed this

Twenty-ninth Day of November, 1988

*Attest:*

DONALD J. QUIGG

*Attesting Officer*   *Commissioner of Patents and Trademarks*